US008533782B2

(12) United States Patent
Soppera et al.

(10) Patent No.: US 8,533,782 B2
(45) Date of Patent: Sep. 10, 2013

(54) ACCESS CONTROL

(75) Inventors: Andrea Soppera, Ipswich (GB); Trevor Burbridge, Ipswich (GB)

(73) Assignee: British Telecommunications public limited company, London (GB)

( * ) Notice: Subject to any disclaimer, the term of this patent is extended or adjusted under 35 U.S.C. 154(b) by 10 days.

(21) Appl. No.: 13/142,677

(22) PCT Filed: Dec. 18, 2009

(86) PCT No.: PCT/GB2009/002918
§ 371 (c)(1),
(2), (4) Date: Jun. 29, 2011

(87) PCT Pub. No.: WO2010/076550
PCT Pub. Date: Jul. 8, 2010

(65) Prior Publication Data
US 2011/0271321 A1 Nov. 3, 2011

(30) Foreign Application Priority Data
Dec. 30, 2008 (EP) ..................................... 08254177

(51) Int. Cl.
*G06F 7/40* (2006.01)
*G06F 15/16* (2006.01)
*G06F 17/30* (2006.01)
*H04L 29/06* (2006.01)

(52) U.S. Cl.
USPC ........... 726/3; 726/1; 726/28; 726/29; 726/30

(58) Field of Classification Search
USPC .......................................... 726/1–10, 27–30
See application file for complete search history.

(56) References Cited

U.S. PATENT DOCUMENTS

| 8,032,921 | B2 * | 10/2011 | Takenaka et al. | 726/1 |
| 8,250,634 | B2 * | 8/2012 | Agarwal et al. | 726/5 |
| 2006/0090196 | A1 * | 4/2006 | van Bemmel et al. | 726/4 |
| 2007/0156659 | A1 * | 7/2007 | Lim | 707/3 |
| 2007/0282986 | A1 | 12/2007 | Childress et al. | |

(Continued)

FOREIGN PATENT DOCUMENTS

| WO | WO 03/083734 | 10/2003 |
| WO | WO 03/088599 | 10/2003 |
| WO | WO 04/002062 | 12/2003 |

OTHER PUBLICATIONS

International Search Report for PCT/GB2009/002918, dated Mar. 17, 2010.

(Continued)

*Primary Examiner* — Kambiz Zand
*Assistant Examiner* — Jing Sims
(74) *Attorney, Agent, or Firm* — Nixon & Vanderhye P.C.

(57) ABSTRACT

A policy store associated with a policy decision point of an access control system is updated. The policy decision point is arranged to provide, in response to received decision requests, access control decisions in dependence on one or more policies stored in the policy store, each policy specifying a predetermined access control decision to be provided in response to a particular access request made in respect of a particular attribute or combination of attributes. The policy decision point is associated with at least one policy enforcement point arranged to implement access control in accordance with access control decisions provided by the policy decision point in response to decision requests submitted by the policy enforcement point, the policy enforcement point having associated therewith an attribute store providing data relating to attributes in respect of which access requests have previously been made via the policy enforcement point.

16 Claims, 12 Drawing Sheets

PEP-PDP Interceptor

(56) References Cited

U.S. PATENT DOCUMENTS

2008/0060080 A1    3/2008  Lim
2009/0125722 A1*  5/2009  Gomaa et al. ................ 713/176

OTHER PUBLICATIONS

Written Opinion for PCT/GB2009/002918, dated Mar. 17, 2010.
European Search Report for EP 08254176, dated Apr. 22, 2009.
European Search Report for EP 08254177, dated Apr. 30, 2009.
Orlov et al., "Basic TrustCom reference implementation", Internet Citation, [Online], Retrieved on Jul. 2006, pp. 50-61.
A Brief Introduction to XACML, [Online], Mar. 14, 2003, 3 pages.
Westerinen et al., "Terminology for Policy-Based Management", *IETF RFC*3198, Nov. 2001, 20 pages.

* cited by examiner

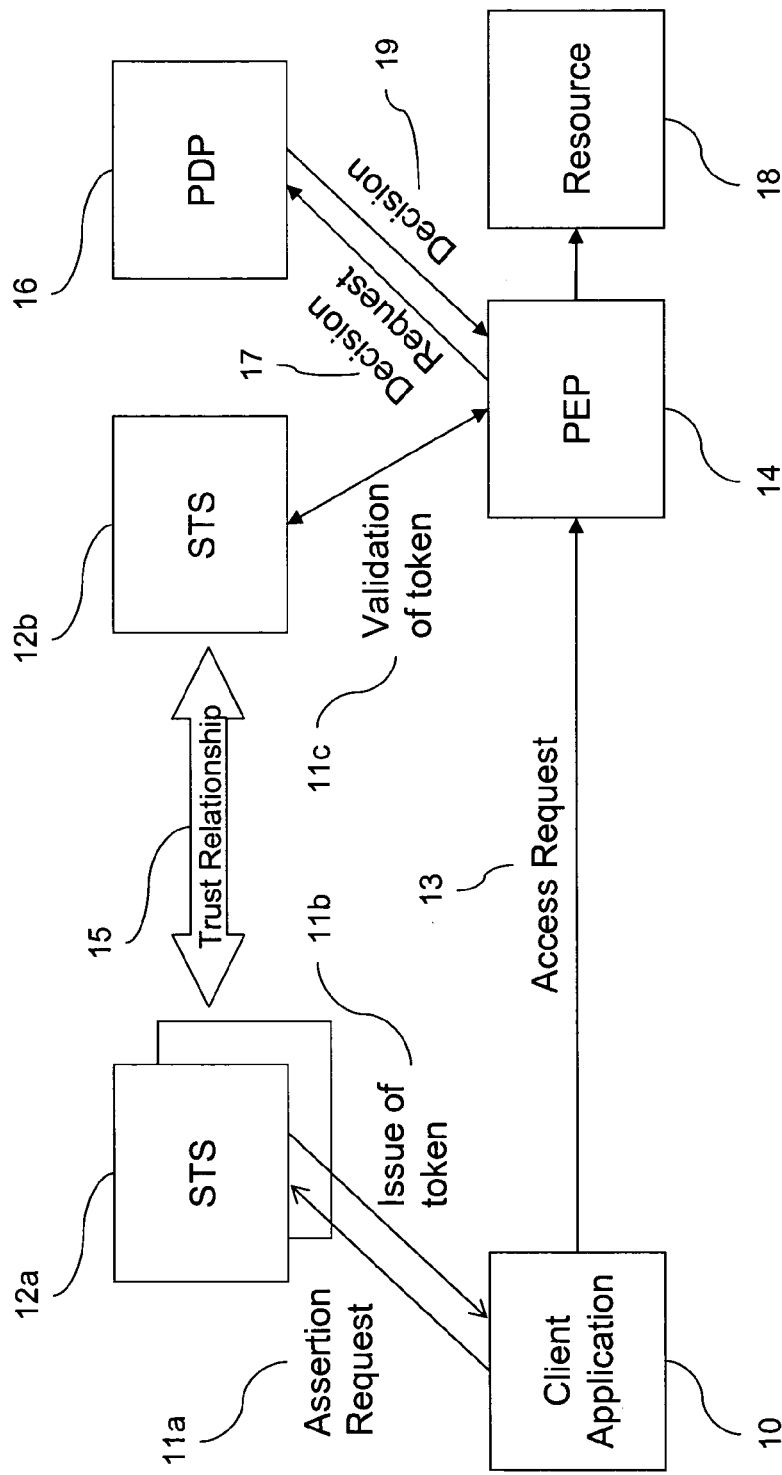
Figure 1 - Example arrangement of components within an IETF Access Control Framework

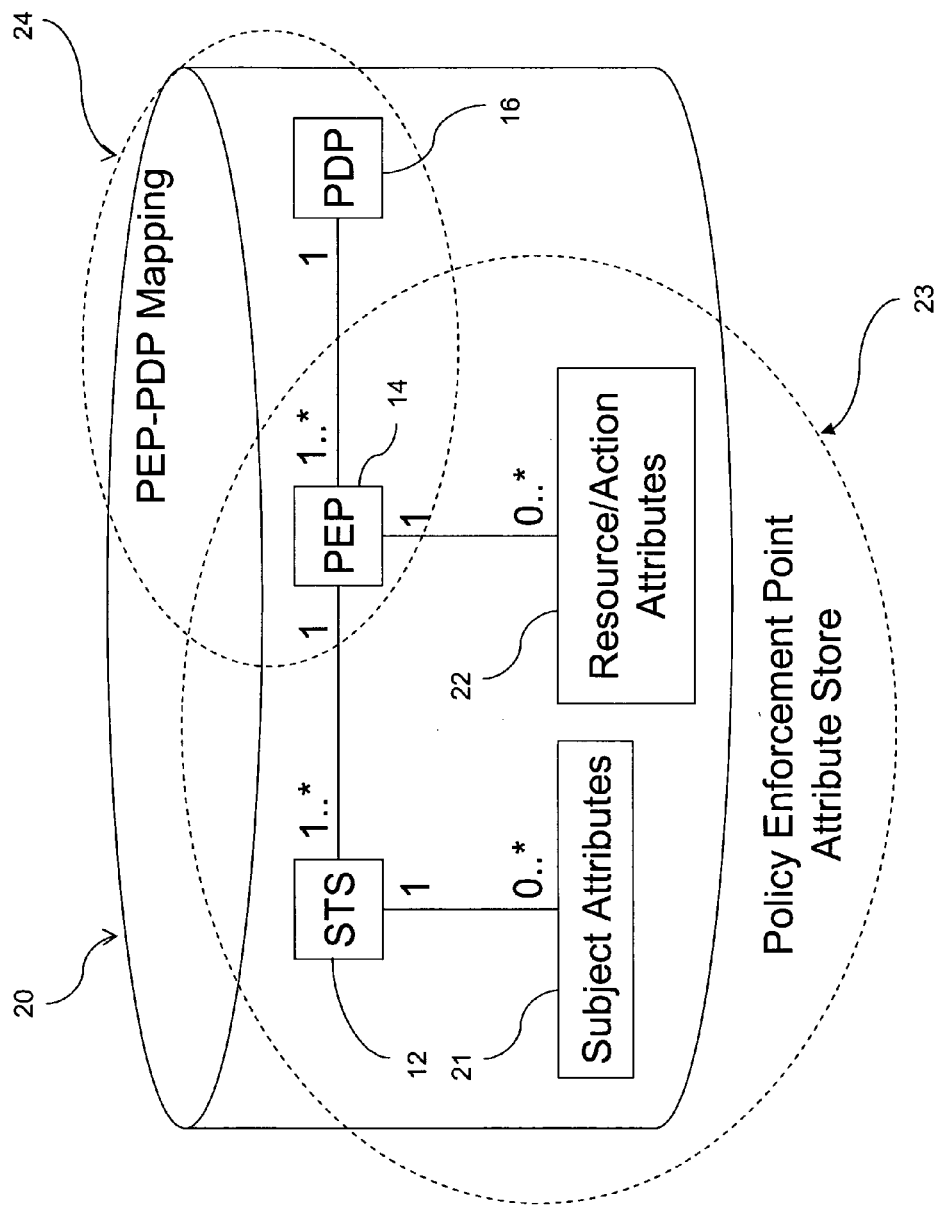
Figure 2 – Data-store for PEP Attribute Records and PEP-PDP Mapping

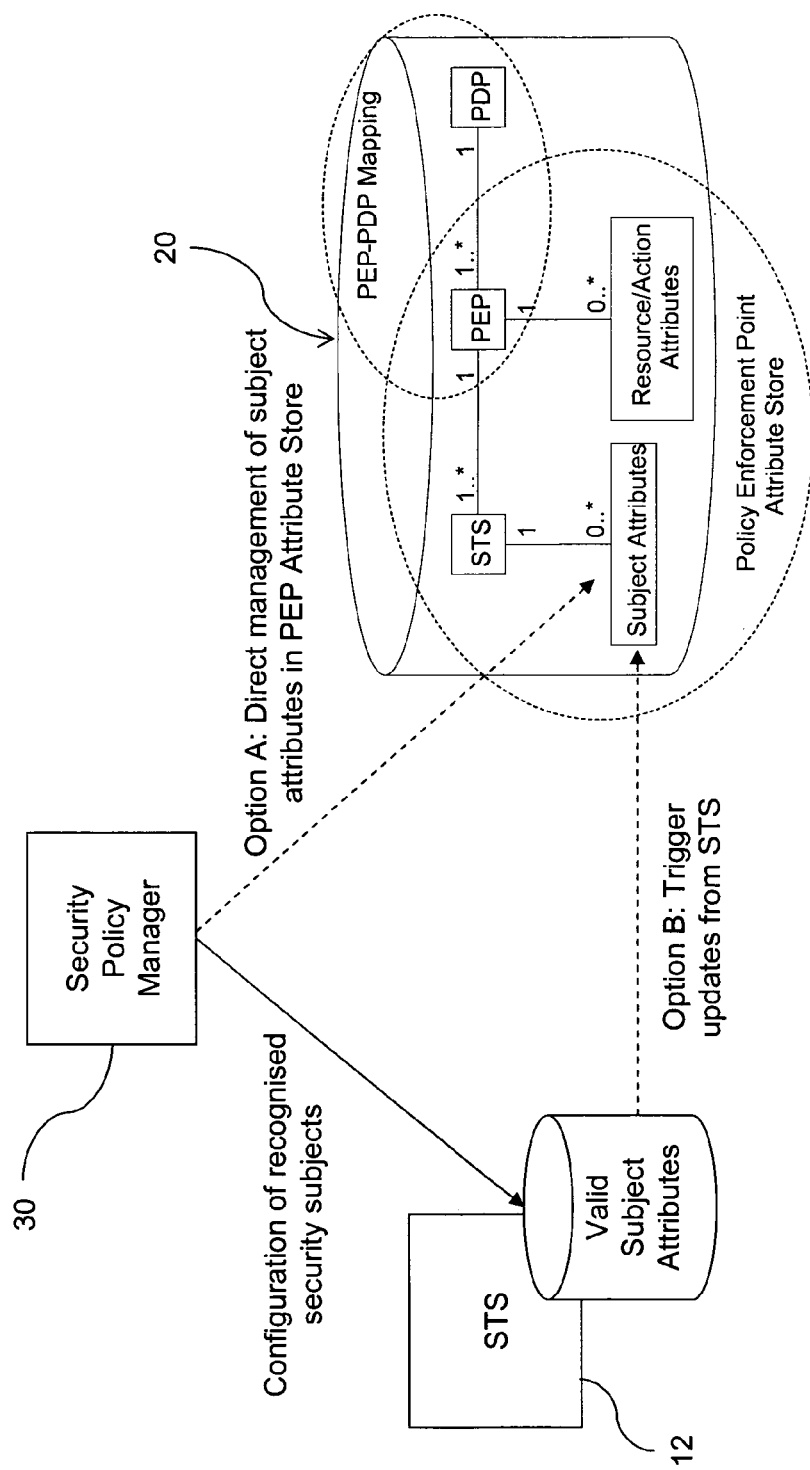
Figure 3 - Capture of Subject Attributes into PEP Attribute Store

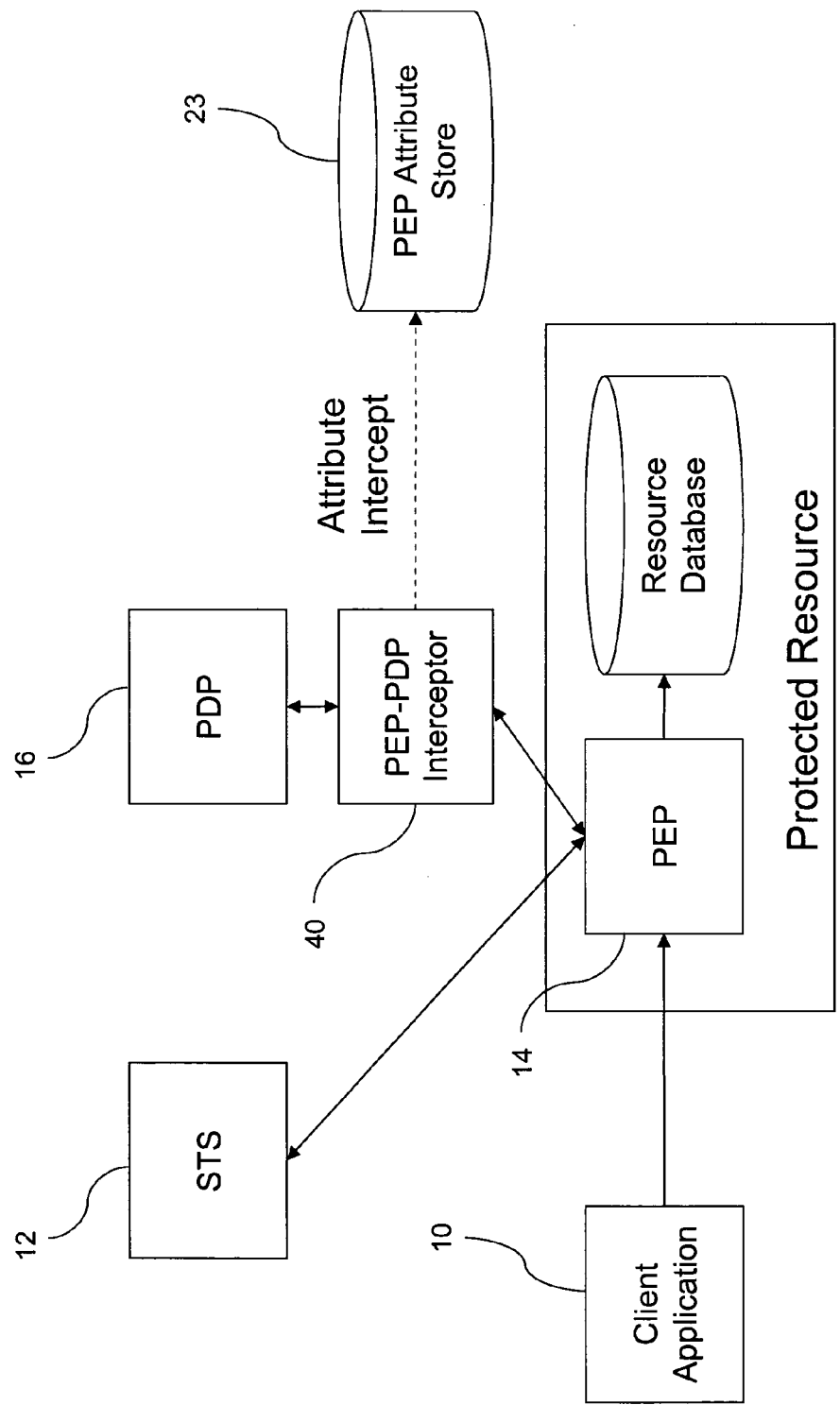
Figure 4 - PEP-PDP Interceptor

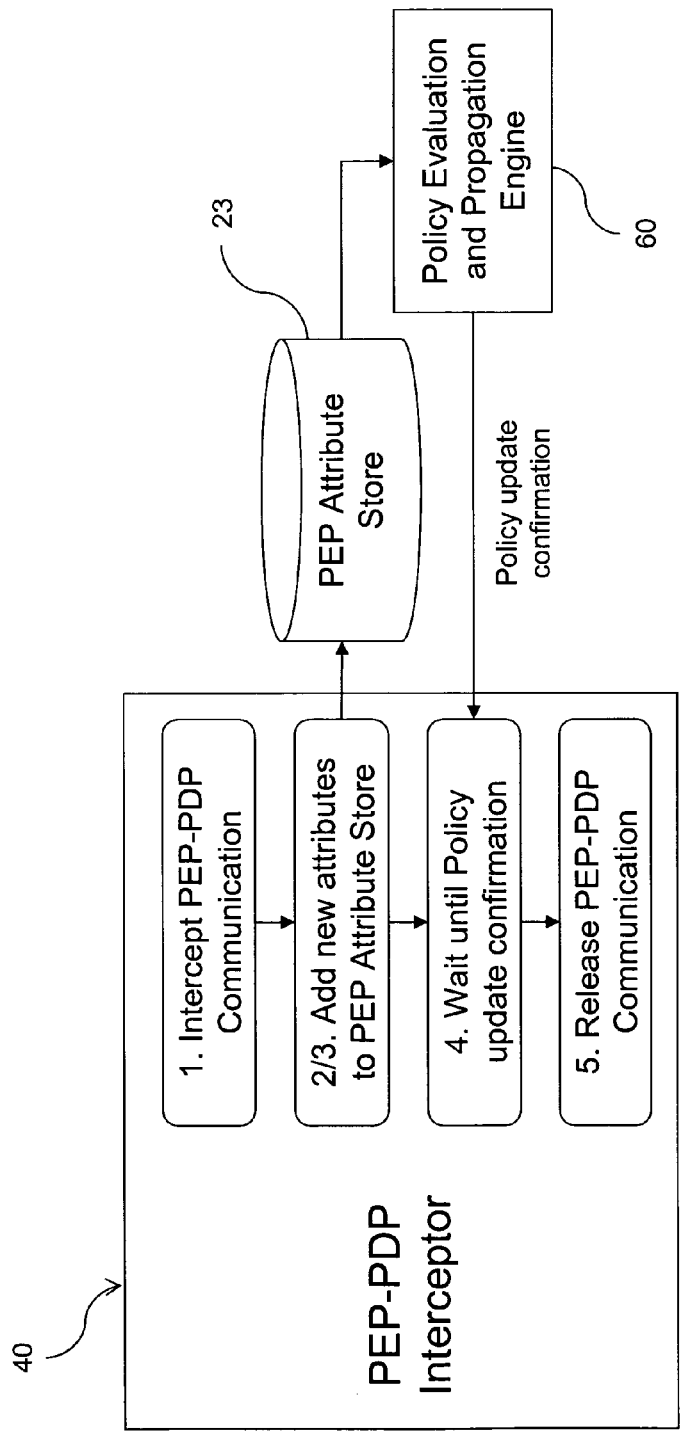
Figure 5 - Process 1: Blocking Intercept of PEP-PDP Communication

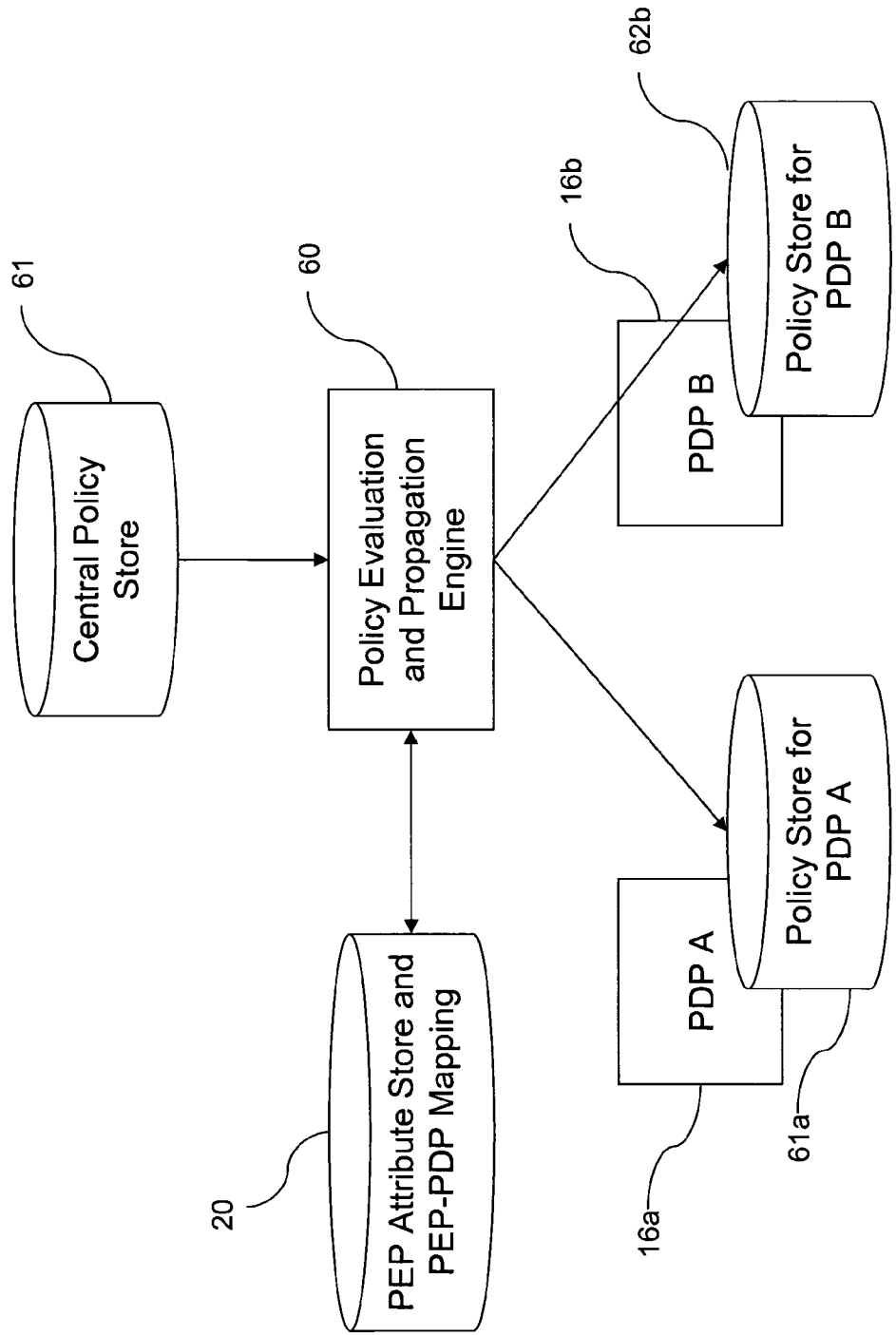
Figure 6 - Propagation of Policies from Central Policy Store to Local PDP Policy Stores

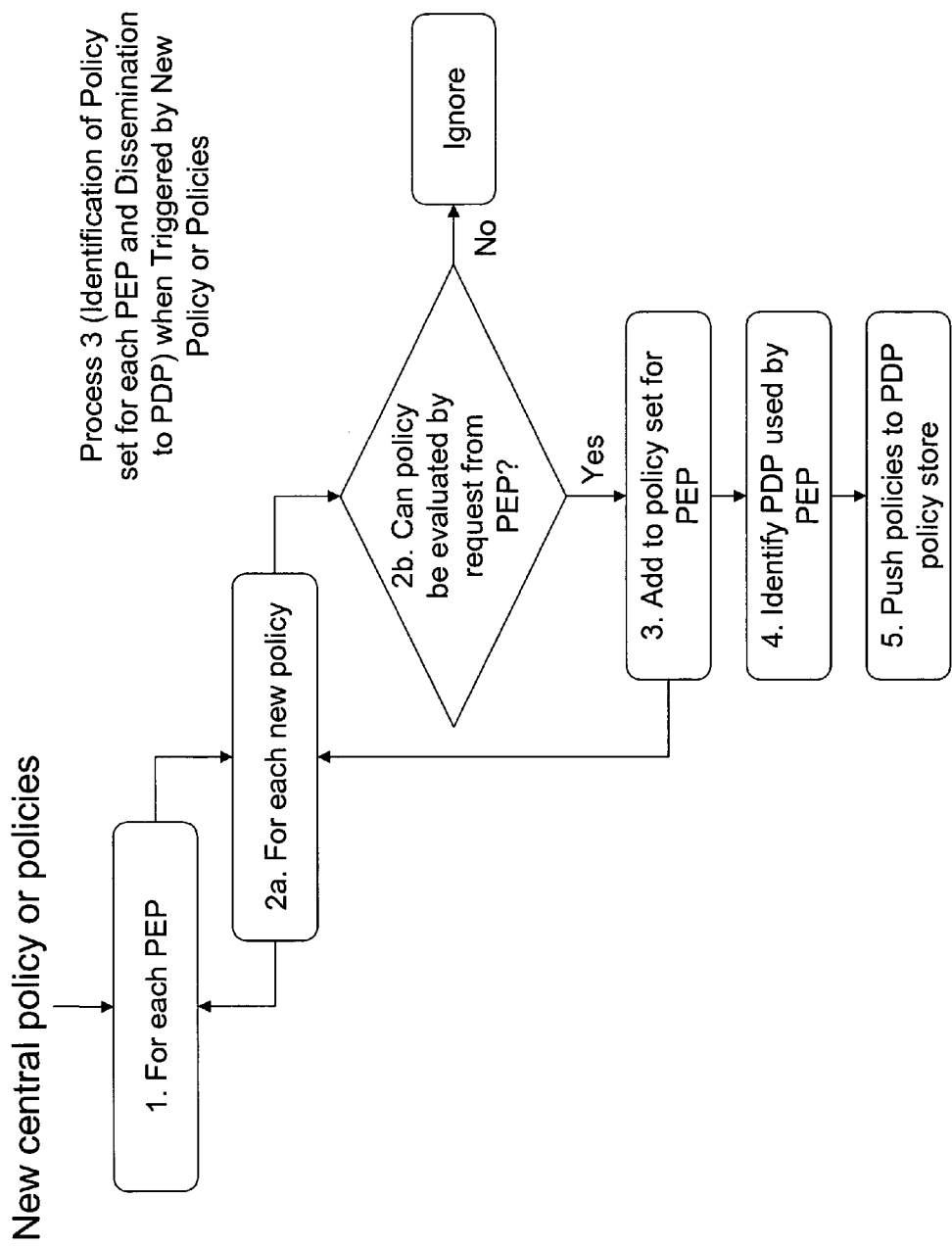
Figure 7(a) - Process 3 when triggered by new policy or policies

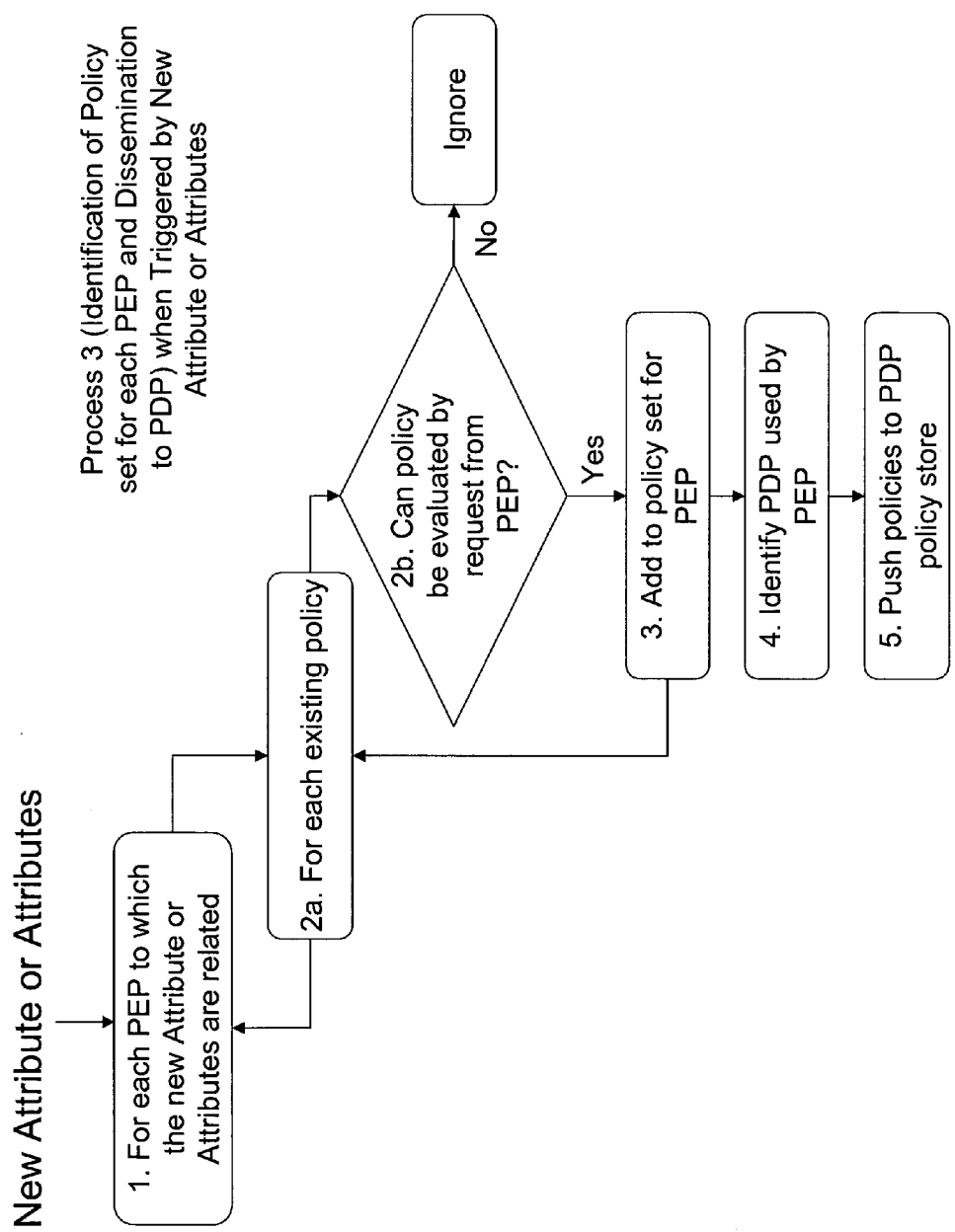
Figure 7(b) - Process 3 when triggered by new attribute or attributes

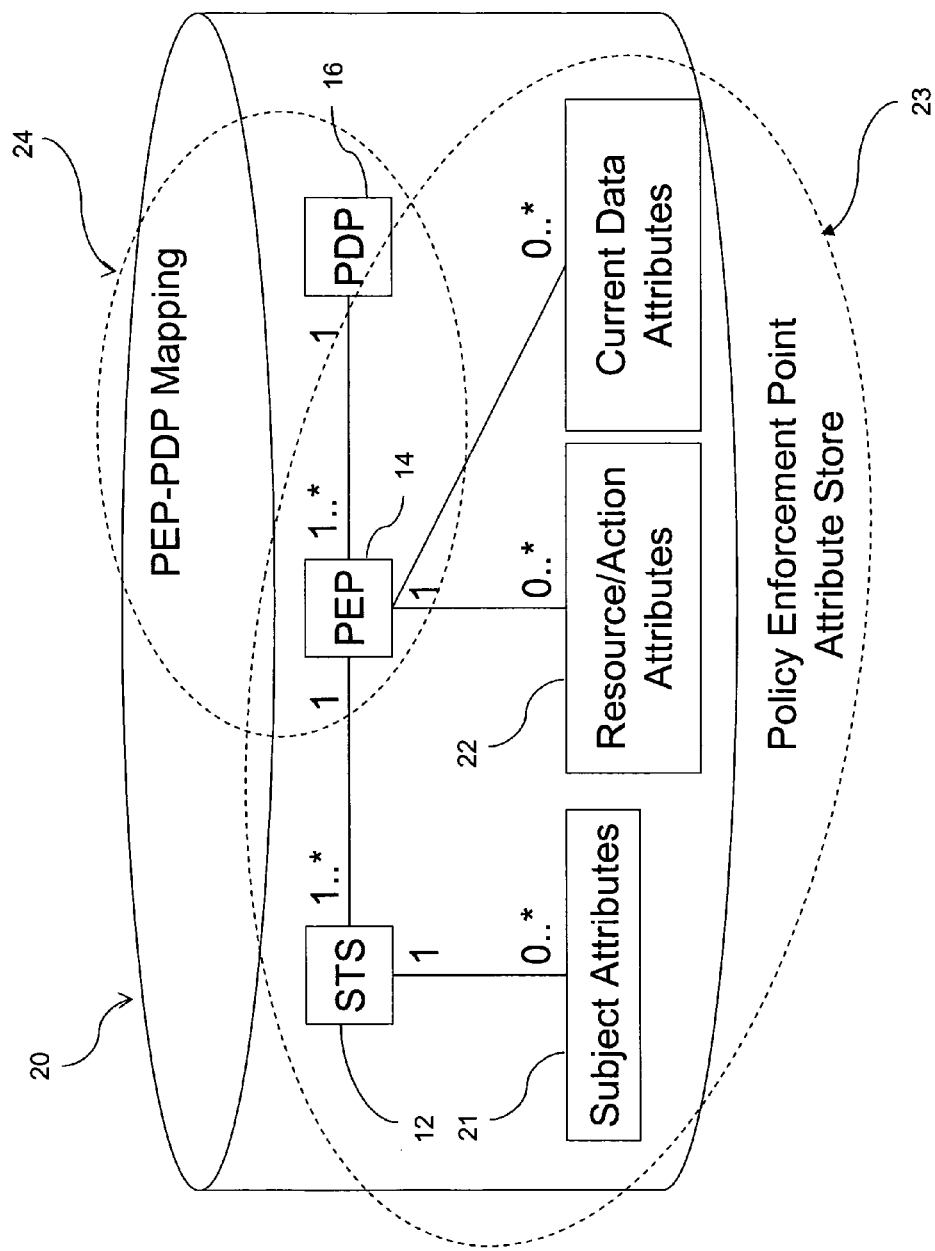
Figure 8 - Extension of PEP Attribute Store for Current Data

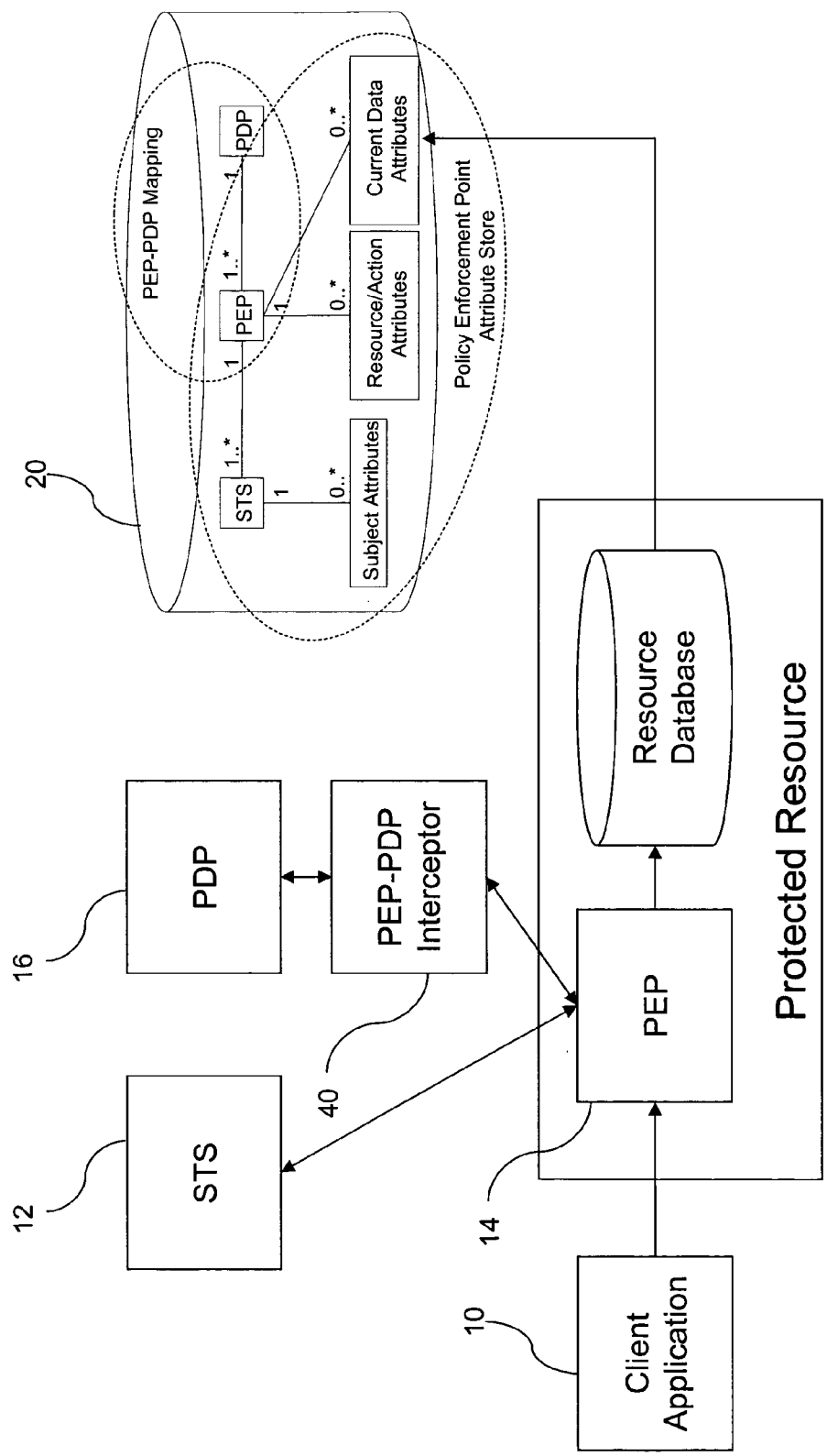
Figure 9 - Extraction of Current Data Attributes

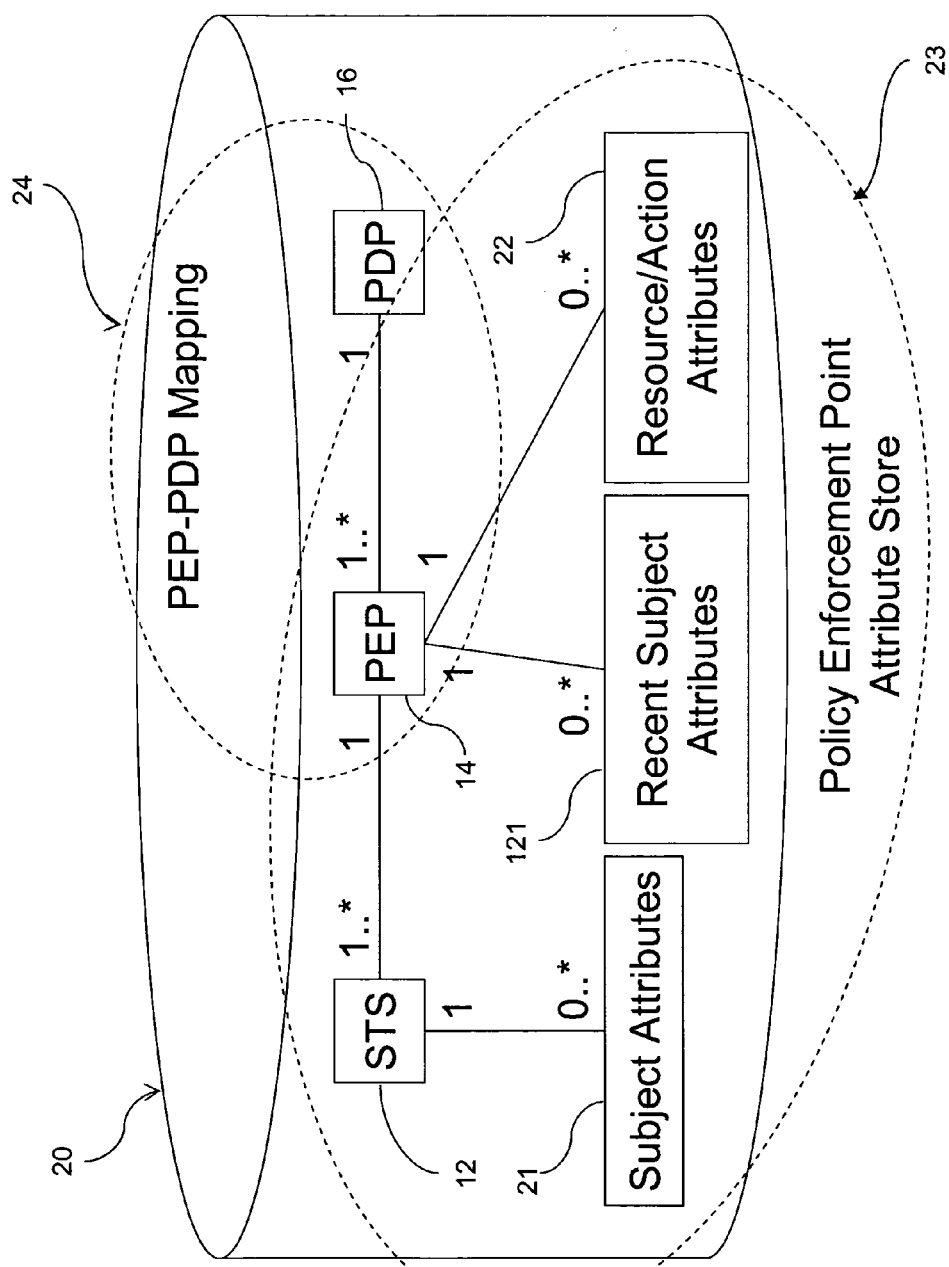
Figure 10 - Extension of PEP Attribute Store for Recent Subjects

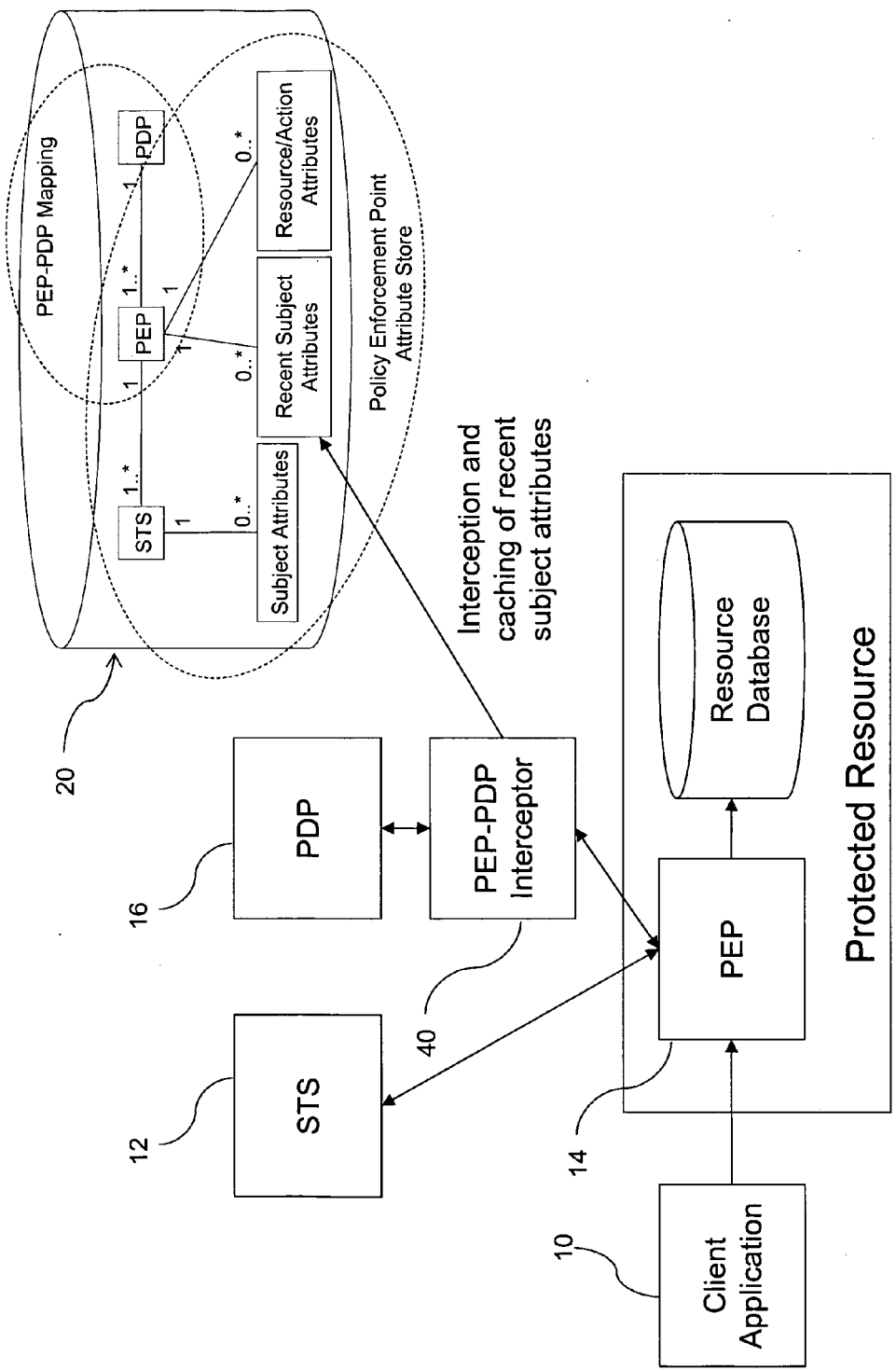
Figure 11 - Extraction of Recent Subject Attributes

ACCESS CONTROL

This application is the U.S. national phase of International Application No. PCT/GB2009/002918 filed 18 Dec. 2009 which designated the U.S. and claims priority to EP Patent Application No. 08254177.2 filed 30 Dec. 2008, the entire contents of each of which are hereby incorporated by reference.

TECHNICAL FIELD

The present invention relates to access control. More specifically, aspects of the present invention relate to methods and apparatus for updating policy stores associated with policy decision points of an access control system, and to methods and apparatus for disseminating policies to policy stores associated with policy decision points of an access control system.

BACKGROUND TO THE INVENTION AND PRIOR ART

Access control in general is the ability to permit or deny the use of a particular resource by a particular entity. Access control mechanisms can be used in managing physical resources (e.g. buildings into which only people holding correct passes are to be admitted), logical resources (e.g. bank accounts), or digital resources (e.g. databases and other such information systems, or specific electronically-stored documents which only certain users should be able to read, amend, delete etc.).

Businesses will increasingly find themselves defining access control policies on a variety of information systems. The separate manual management of policies at each point is very costly in terms of human effort. The cost of such effort can lead to mistakes being made, and the temptation to implement simpler policies rather than those that are correct for the business. In addition the separate management, often by separate persons or authorities, can lead to inconsistencies that may be exploited to gain sensitive business information or gain access to critical systems.

At the technology level policies expressed in languages such as XACML express criteria about the Subject (the entity attempting to gain access) and the Resource (the system/data being accessed). XACML will be discussed later, but an explanation is provided in the article: "A Brief Introduction to XACML" available on the internet at the following address: http://www.oasis-open.org/committees/download.php/2713/Brief_Introduction_to_XACML.html In RFID systems, much of this data is keyed against, or relates to product or shipping container identifiers, such as EPCs (Electronic Product Codes). Subjects are generally referred to by certified identities. These policies are generally stored and evaluated by Policy Decision Points (PDPs), and enforced by Policy Enforcement Points (PEPs). The larger the set of policies that are evaluated, the longer the access decision will take. Thus it is desirable to minimise the set of policies available to a Policy Decision Point. Manually controlling this dissemination, like manually creating the policies separately, is costly and error prone. Too many policies will affect performance, whereas too few policies will not result in the desired behaviour of the system (for example someone being denied access where it should have been granted).

A single policy (for example for access to information about some goods) may affect multiple resources (such as the serialised information system, or EPCIS, the serialised discovery service, the supplier handling system, the customer handling system etc.). For example, a policy that allows shipping information may grant access to an Advanced Shipping Notice on one ERP (Enterprise Resource Planning) system, along with records within an EPCIS (Electronic Product Code Information Service) for specific EPCs. Such policies should not be distributed to resources where they will not affect the behaviour (since the Subject or Resource/Action criteria used by the Policy Enforcement Point will never match the policy). Storage and evaluation of such redundant policies is wasteful and will delay access to the resource.

Methods and systems to be described relate to the automated distribution of access control policies from a central repository, for example, to access policy decision points for multiple resources that are to be protected.

PRIOR ART

The Internet Engineering Task Force (IETF) defines an access control model (see A. Westerinen: "Terminology for Policy-Based Management", IETF RFC 3198, November 2001, available at http://www.ietf.org/rfc/rfc3198.txt. A discussion of this is given below. The International Organization for Standardization (ISO) defines a similar model.

Referring briefly to prior patent documents, United States application US 2007/0156659 (naming "Lim" as its inventor) relates to information and document management, and more specifically to a policy language system for managing information. It discloses techniques and systems for deploying policies in an information management system in which relevant policies are deployed to targets while policies which are not relevant are not. By deploying relevant policies, space requirements at the target to store the policies and the amount of data that needs to be sent to the target can be reduced, while execution speed at the target may increase since the target does not need to evaluate policies that are not relevant.

Another United States application US 2008/0060080 (also naming "Lim" as its inventor) relates to access and usage control and management of information stored in a computer environment, and more specifically to methods and apparatus for controlling access to and usage of electronic information using centrally managed rules in a computer environment. The rules are stored and manipulated in a central rule database via a rule server. Policy enforcers are installed on client systems and/or on servers and perform document access and application usage control for both direct user document accesses and application usage, and application program document accesses by evaluating the rules sent to the policy enforcer. The rule server decides which rules are required by each policy enforcer. A policy enforcer can also perform obligation and remediation operations as a part of rule evaluation. Policy enforcers on client systems and servers can operate autonomously, evaluating policies that have been received, when communications have been discontinued with the rule server.

An International application published as WO 2004/002062 ("Siemens") relates to a policy management method and system for managing the distributed network elements of a computer network. Such a system comprises event generators, event consumers, at least one event server, and a communication mechanism coupling the event generators with the event consumers via the event server and providing event generation and reception. The event generators may comprise a Policy Repository Adapter for managing the access to a policy repository, a Rule Scheduler scheduling the installation and de-installation of policy rules, and a Policy Enforcement Point manager reporting events which are generated by the Policy Enforcement Points. The event consumers comprise a Policy Decision Engine managing the installation and de-installation of policy rules and receipt of events.

SUMMARY OF THE INVENTION

According to a first aspect, there is provided a method of updating a policy store associated with a policy decision point of an access control system, the policy decision point being arranged to provide, in response to received decision requests, access control decisions in dependence on one or more policies stored in said policy store, each policy specifying a predetermined access control decision to be provided in response to a particular access request made in respect of a particular attribute or combination of attributes, the policy decision point being associated with at least one policy enforcement point arranged to implement access control in accordance with access control decisions provided by said policy decision point in response to decision requests submitted by said policy enforcement point, said policy enforcement point having associated therewith an attribute store providing data relating to attributes in respect of which access requests have previously been made via said policy enforcement point; the method comprising:
  monitoring decision requests submitted by said policy enforcement point to said policy decision point;
  identifying, from said monitoring and with reference to the attribute store associated with said policy enforcement point, decision requests submitted by said policy enforcement point in respect of any attribute for which said attribute store provides no data;
  in the event that a decision request is identified in respect of an attribute for which said attribute store provides no data, updating said attribute store with data relating to said attribute; and
  updating the policy store associated with said policy decision point with one or more policies specifying predetermined access control decisions to be provided in response to access requests made in respect of said attribute.

According to preferred embodiments of the first aspect, the method may further comprise performing the steps of updating said attribute store and updating the policy store also in the event that a decision request is identified in respect of an attribute for which said attribute store provides insufficient data, or in respect of an attribute for which said attribute store provides an indication that updating of the attribute store or updating of the policy store is required. Such embodiments may be appropriate in situations where an attribute has been "timed out" (as will be explained later), but rather than deleting all data about it, an attribute store still holds data about it, indicating that it has been timed out, for example.

The method may comprise intercepting requests submitted by said policy enforcement point to said policy decision point whereby to perform said monitoring.

In what will be referred to as a "blocking" mode, decision requests identified in said identifying step may be prevented from reaching the policy decision point until after the step of updating the policy store has been performed. Alternatively, in the event of a decision request being identified in said identifying step, the policy decision point may be delayed from making an access control decision in response to said decision request until after the step of updating the policy store has been performed. By virtue of either of these options, the making of the access control decision may be delayed until such time as updates relevant thereto have been made to the appropriate policy store.

In what will be referred to as a "non-blocking" mode, the method may involve performing said monitoring without requests submitted by said policy enforcement point to said policy decision point being held from reaching said policy decision point.

According to preferred embodiments, the monitoring step may comprise subjecting said decision requests to deep packet inspection. Alternatively or additionally, the monitoring step may comprise sniffing said decision requests.

According to preferred embodiments, updating an attribute store may further comprise identifying any attributes deemed unnecessary in said attribute store and removing them from said attribute store. An attribute in an attribute store may be deemed unnecessary in the event that a predetermined period of time has elapsed since a previous access request was made via said policy enforcement point in respect of said attribute.

According to preferred embodiments, updating a policy store may further comprise identifying any policies deemed unnecessary in the policy store and removing them from the policy store. A policy in a policy store may be deemed unnecessary in the event that a predetermined period of time has elapsed since a previous access control decision was made in dependence on said policy.

Updating of said policy store may be performed in response to a determination that an attribute store associated with a policy enforcement point with which said policy decision point is associated has been updated. Alternatively or additionally, updating of said policy store may be performed in response to an indication of a new policy being available from a policy controller, or in response to an indication from a policy controller of an existing policy being withdrawn.

There is also provided an apparatus operable to perform a method according to the first aspect.

According to a second aspect, there is provided a method of disseminating one or more new policies to one or more policy stores associated with policy decision points of an access control system, each policy decision point being arranged to provide, in response to received decision requests, access control decisions in dependence on one or more policies stored in a policy store associated with said policy decision point, the or each policy specifying a predetermined access control decision to be provided in response to a particular access request made in respect of a particular attribute or combination of attributes, the policy decision points each being associated with at least one of a plurality of policy enforcement points arranged to implement access control in accordance with access control decisions provided by said policy decision point in response to decision requests submitted by said policy enforcement point, said policy enforcement point having associated therewith an attribute store providing data referring to attributes deemed to be relevant to said policy enforcement point; the method comprising:
  receiving an indication of one or more new policies;
  in respect of the or each new policy, identifying at least one set of attributes which, if an access request were to be made in respect of that set of attributes, would enable at least one of said policy decision points to provide an access control decision in dependence on that policy; and
  in respect of each of a plurality of policy enforcement points, and in respect of the or each new policy:
(i) determining in dependence on the set of attributes identified in respect of that policy and in dependence on the attributes referred to in an attribute store associated with that policy enforcement point whether said new policy specifies an access control decision to be provided in response to any decision request that may be made by said policy enforcement point; and (ii) in the event of a determination that said new policy does specify the access control decision to be provided in response to a decision request that may be made by said policy enforcement point, providing said new policy for storage in a policy store associated with the policy decision point with which said policy enforcement point is associated.

According to preferred embodiments of the second aspect, the set of attributes identified in respect of each new policy may comprise a minimum set of attributes which, if an access request were to be made in respect of that set of attributes, would enable at least one of said policy decision points to provide an access control decision in dependence on that policy.

According to preferred embodiments of the second aspect, step (i) may comprise determining that said new policy specifies an access control decision to be provided in response to a decision request that may be made by said policy enforcement point if the set of attributes identified in respect of the policy is a subset of the attributes referred to in the attribute store associated with that policy enforcement point.

Preferred embodiments according to the second aspect thus enable a policy dissemination method to be performed by a policy evaluation and propagation engine on receipt of one or more new policies, from a central policy store, for example.

According to a third aspect, there is provided a method of disseminating one or more policies to one or more policy stores associated with policy decision points of an access control system, each policy decision point being arranged to provide, in response to received decision requests, access control decisions in dependence on one or more policies stored in a policy store associated with said policy decision point, the or each policy specifying a predetermined access control decision to be provided in response to a particular access request made in respect of a particular attribute or combination of attributes, the policy decision points each being associated with at least one of a plurality of policy enforcement points arranged to implement access control in accordance with access control decisions provided by said policy decision point in response to decision requests submitted by said policy enforcement point, said policy enforcement point having associated therewith an attribute store providing data referring to attributes deemed to be relevant to said policy enforcement point; the method comprising:

receiving a new indication that at least one attribute is deemed newly-relevant to at least one policy enforcement point;

in respect of the or each policy, identifying at least one set of attributes which, if an access request were to be made in respect of that set of attributes, would enable at least one of said policy decision points to provide an access control decision in dependence on that policy; and in respect of the or each policy enforcement point in relation to which a new indication has been received, and in respect of the or each policy:

(i) determining in dependence on the set of attributes identified in respect of that policy and in dependence on the attributes referred to in an attribute store associated with that policy enforcement point whether said policy specifies an access control decision to be provided in response to any decision request that may be made by said policy enforcement point; and (ii) in the event of a determination that said policy does specify the access control decision to be provided in response to a decision request that may be made by said policy enforcement point, providing said policy for storage in a policy store associated with the policy decision point with which said policy enforcement point is associated.

Preferred embodiments according to the third aspect thus enable a policy dissemination method to be performed by a policy evaluation and propagation engine following a determination that an attribute has become relevant to a particular policy enforcement point, for example.

According to preferred embodiments of the second or third aspect, said policies may specify access control decisions to be provided in response to access requests made in respect of attributes selected from resource, subject and action attributes.

According to preferred embodiments of the second or third aspect, the method may further comprise updating an attribute store by identifying any attributes not deemed relevant to the policy enforcement point associated therewith and removing them from said attribute store. An attribute in an attribute store may be deemed not relevant in the event that a predetermined period of time has elapsed since a previous access request was made via said policy enforcement point in respect of said attribute.

According to preferred embodiments of the second or third aspect, the method may further comprise updating a policy store by identifying any policies deemed unnecessary in said policy store and removing them from said policy store. A policy in a policy store may be deemed unnecessary in the event that a predetermined period of time has elapsed since a previous access control decision was made in dependence on said policy.

There is also provided an apparatus operable to perform a method according to the second and/or third aspects.

Preferred embodiments thus relate to the automated distribution of access control policies from a central repository, for example, to access policy decision points for multiple resources that are to be protected. On the basis that policies need only be distributed to points where they are relevant, preferred embodiments may for example be arranged such that if a policy contains any Subject or Resource terms that a particular Policy Decision Point will never be asked to evaluate, then that Policy Decision Point will not receive that policy.

BRIEF DESCRIPTION OF THE DRAWINGS

Preferred embodiments of the present invention will now be described with reference to the appended drawings, in which:

FIG. 1 shows a schematic diagram of an example arrangement of components within an access control framework;

FIG. 2 shows the functional components that may be present in a data-store for PEP attribute records and a PEP-PDP mapping;

FIG. 3 shows how Subject attributes may be captured into an attribute store of a PEP;

FIG. 4 illustrates how a PEP-PDP Interceptor may be located to intercept communications between a PEP and a PDP;

FIG. 5 illustrates the functional steps that may be performed by a PEP-PDP Interceptor operating in a "Blocking Mode" (see Process 1 below);

FIG. 6 shows an example arrangement of functional components that may be involved in the propagation of access policies from a Central Policy Store to local PDP Policy Stores;

FIGS. 7a and 7b illustrate how appropriate policies may be identified for PEPs and disseminated to appropriate PDPs by a Policy Evaluation and Propagation Engine;

FIG. 8 shows how a data-store such as that of FIG. 2 may be extended for storage of current data;

FIG. 9 shows how current data attributes may be extracted and propagated to a PEP attribute store;

FIG. 10 shows how a data-store such as that of FIG. 2 may be extended for storage of recent Subject attributes; and FIG. 11 shows how recent Subject attributes may be extracted.

DESCRIPTION OF PREFERRED EMBODIMENTS OF THE INVENTION

Various embodiments will be described later with reference to the above Figures, but firstly, a brief explanation of some of the background to the field of Access Control will be given with reference to the Internet Engineering Task Force (IETF) model referred to earlier, and to FIG. 1.

Access Control Technology

In the IETF model, an access request 13 made by a client application 10 to a Resource 18 (for example a Web Service or networked database) is routed through a Policy Enforcement Point (PEP) 14. The PEP 14 is responsible for extracting a set of attributes about the access request over which an access control decision 19 will be made. Such attributes may include "Subject" attributes (about who is asking for access), "Action" attributes (about what they are trying to do) and "Resource" attributes (about what they are trying to access).

Commonly, Subject attributes are presented in the form of security assertions in a language such as SAML (Security Assertion Markup Language), standardised by OASIS (Organization for the Advancement of Structured Information Standards). SAML allows Subject attributes to be expressed as digitally-signed assertions. For example an "Identity Provider" 12a may assert the identity of the client 10 attempting access to the resource 18. This assertion may take the form of a token signed by the Identity Provider 12a which is issued (11b) in response to an assertion request (11a), the token being carried within the access request 13. Identity Providers and other entities providing assertions (for example "Roles" when using Role-Based Access Control) are called generically Security Token Services (STS).

A Policy Enforcement Point (PEP) 14 receiving an access request 13 generally needs to validate any external Subject attribute assertions (such as those carried as SAML tokens). In order to do so the PEP 14 may send such assertions to a trusted STS 12b. As well as issuing tokens an STS may also have a role of validating tokens (11c). One STS 12 may perform both roles (providing assertions 11b and validating tokens 11c), but if the STS validating tokens is not the same one that issued the token, then a trust relationship 15 would generally exist between the issuing and the validating STSs 12a and 12b. If the validating STS 12b accepts that the issuing STS 12a is allowed to make the assertion, then the token is also authenticated and may be checked for integrity. The STS 12b may then respond back to the PEP 14 with the assertions that it is willing to accept, and these may then become Subject attributes used in the access control decision. Other Subject attributes not presented as security tokens may include the identity used to secure the communications or an IP address, for example.

Since the functions of issuing and validating tokens may be either be performed by one STS or by different STSs, further explanation will be made with reference simply to "an STS 12" in order to simplify the explanation and the accompanying drawings, but it will be understood that there may equally well be two STSs 12a and 12b as discussed above.

The PEP 14 generally also needs to extract the Action and Resource attributes from the access request 13. To do so, the PEP 14 needs to understand the format and the meaning of elements of the request 13. For example a Resource attribute may be the URL of a Web Service, but might also include the table name of a database, or even the text that must be contained in responses to a search request. Actions on a database may include Select, Delete etc.

Once all of the decision attributes (i.e. those attributes passed to the PDP to make the decision) have been compiled, the PEP 14 asks a Policy Decision Point (PDP) 16 to make the decision. In order to do this, a decision request 17 may be expressed in a language such as XACML (eXtensible Access Control Markup Language). The PDP 16 receives such a request and compares the attributes against those expressed within the access control policies in its policy store. These policies may also be expressed in XACML. Such a policy might express that an access request with the Subject attribute value 'employee ID=12345' may perform a 'Select' action on the resource 'Payroll database'. A PDP 16 conforming to the XACML OASIS standard will return a "Permit", "Deny", "Indeterminate" or "Not Applicable" decision to the PEP 14, along with a status code and any further obligations which must be fulfilled by the PEP. PDPs conforming to other standards may return decisions from a different set of possible decisions.

The STS 12 and PDP 16 are usually expected to be implemented in software operating on networked computing platforms separate from the PEP 14 and the resource 18. Thus a single STS 12 or PDP 16 may be shared by a number of PEP components. The PEP 14 may be implemented as a gateway to a number of resources (in which case it may be implemented on a separate computing platform), or the PEP component may be integrated within the resource it protects. In this case the resource may itself receive the access control request and an internal PEP software component may then perform the communication to the STS and PDP.

Various embodiments will now be described with reference to FIGS. 2 to 11.

Determining the Relevance of a Policy to a PDP

Decisions on whether particular policies are relevant for a particular Policy Decision Point 16 may be made by analysing the (one or more) Policy Enforcement Point(s) 14 which will ask that Policy Decision Point 16 for an access control decision 19. Knowledge of the identities and nature of such Policy Enforcement Points may be used to determine which Resource attributes are relevant. In addition a Policy Enforcement Point may use a Security Token Service to validate Subject attributes. Knowledge of the Security Token Service can be used to extract which Subject attributes may therefore be relevant at the Policy Decision Point. If it is known that a Security Token Service will never validate a Subject Attribute, then it can be deduced that the Policy Enforcement Point will never request that the Policy Decision Point evaluates policies against such a Subject attribute. For example, if a client application presents an identity token that is not validated by the STS, then policies which refer to that identity do not need to be evaluated.

A Policy Enforcement Point 14 is generally expected only to recognise attributes in the form of security tokens, issued from one or more trusted Security Token Services 12. A list may be maintained of all such Subject attributes against each STS, and mapped to any PEP that uses the STS. In addition, each Policy Enforcement Point 14 may use different Resource and Action attributes during the access control process. For example, a record may be kept that a PEP 14 will attempt to evaluate policies based on the EPCs (Electronic Product Codes) retrieved from a "Read" action. Another PEP may ask for the evaluation of policies for order reference numbers. Different policies will be therefore be evaluated by different PEPs.

Extraction of PEP Attributes

The available Subject attributes 21 and Resource/Action attributes 22 used by a particular PEP 14 may be manually or automatically entered into the attribute records of an attribute store 23 associated with that PEP. A suggested structure for a data-store 20 containing these records is shown in FIG. 2, along with the Policy Decision Point (PDP) used by the (or more than one) PEP indicating the mapping 24 between the PDP 16 and the PEP (or PEPs) 14.

While the Resource and Action attributes used by the PEP 14 are generally relatively static (depending upon the implementation of the PEP), the Subject attributes recognised by the STS 12 are generally dynamically configured as part of a policy within the STS. Thus Subject attributes may change, and such changes can be automatically propagated from the STS policies to the attribute records associated with the PEP. There are several methods to achieve this. With reference to FIG. 3, an STS policy manager 30 application may for example be arranged to record such records directly when new STS policies are created (i.e. this is indicated by the dotted line marked as "Option A"). Alternatively, a program can be written to detect changes to the STS policy database and push the attribute changes to the attribute records within the data-store 20 (i.e. this is indicated by the dotted line marked as "Option B").

A third method that may be used for not only Subject attributes, but Resource and Action attributes as well is to monitor and/or intercept communications from the PEP 14 to the PDP 16. This can be done by implementing a functional component 40 which will be referred to as an "Interceptor" as a proxy for the PDP 16, and directing the PEP request directly to the Interceptor, which can then relay the request to the real PDP. Alternatively the Interceptor 40 may be implemented by "sniffing" the communications between the PEP 14 and the PDP 16 (for example by sniffing for all data packets to the PDP's IP Address and using the port for the PDP service), or by using Deep Packet Inspection (DPI) technology to understand the PDP traffic and intercept PDP communications. An example of how a PEP-PDP Interceptor 40 may be located to monitor and/or intercept communications between a PEP 14 and a PDP 16 is shown in FIG. 4.

Whenever the PEP 14 asks for a decision on a new attribute that has not been seen before, this attribute can be pushed to the attribute store 23 for that PEP. Removal of attributes should also be considered. Attributes that have not been seen for a certain period of time, for example, may be 'timed-out' and removed from the attribute store 23. A common time-out value may be specified for all attributes, or alternatively priority may be given to selected attributes. For example, it may be arranged that identity Subject attributes for priority business partners are never timed-out, or that a signal is sent to a human administrator who may decide whether or not to keep the attribute in the store.

When a new attribute is seen by the PEP-PDP interceptor 40, the related policies need to be copied (preferably immediately) to the PDP 16 before the request can be evaluated against the correct or updated policy set. In order to do this, the PEP's decision request 17 may be held by the interceptor 40 until the policies in a corrected or updated policy set are available. Alternatively, for example if the new policies cannot be loaded into the PDP 16 within the latency expected by the application, then the Interceptor 40 may return an error stating that PDP policy evaluation is unavailable and that the client application should try again later. An example process operated by the PEP-PDP Interceptor 40 is set out below as "Process 1" and illustrated in FIG. 5. This version is an example of the Interceptor operating in what will be referred to as a "Blocking Mode".

Process 1 for the PEP-PDP Interceptor 40 operates as follows:
1. Intercept access decision request 17 from PEP 14 to PDP 16.
2. Identify attributes in the intercepted PDP request 17.
3. Add any new attributes to the set for that PEP (in PEP attribute store 23)
4. Wait for confirmation that all relevant policies have been added to PDP's policy store
5. Pass access decision request from Interceptor 40 to PDP 16

Note that the process described above blocks the request to the PDP 16 until any new attributes are identified and the relevant policies have been installed. In an alternative version, an example of which will be described below, the Interceptor 40 may operate in what will be referred to as a "Non-Blocking Mode". In such non-blocking variants, the request may be allowed to proceed immediately to the PDP 16 even before Step 2 above has been performed. If the Interceptor 40 is implemented by sniffing the traffic between the PEP and PDP, this non-blocking mode is generally more appropriate since the original network traffic does not need to be stopped.

In a non-blocking mode, a PDP proxy implementation of the Interceptor 40 may also receive the reply from the PDP 16 back to the PEP 14. This can be useful to inform the client application 10 that their request may have failed due to an incomplete policy set at the PDP. This can be implemented in XACML through the use of the status codes in the response. A non-blocking proxy version of the Interceptor may operate as follows in Process 2:
1. Intercept access decision request 17 from PEP 14 to PDP 16.
2. Pass access decision request from Interceptor 40 to PDP 16.
3. Identify attributes in the intercepted PDP request.
4. Add any new attributes to the PEP attribute set (in PEP attribute store 23).
5. Obtain reply from PDP 16 to PEP 14.
6. If new attributes were identified, modify reply to client to include an error notification code indicating that the policy set was incomplete.

Note that Steps 3 & 4 and Step 5 can be performed in parallel.

It will be noted that an additional component referred to as a Policy Evaluation and Propagation Engine 60 is shown. The function of this relates to the propagation of policies, generally from a central policy store, to the policy stores of individual PDPs, and will be explained, in relation to FIG. 6 below.

Updating Policy Set

To evaluate whether a policy on the central repository 61 is relevant at an individual PDP 16, each policy may be compared to the possible Subject/Resource/Action attributes used by each PEP 14 that refers to that PDP 16. This comparison may take place whenever a new policy is created in the central repository 61, or whenever new attributes are associated with a PEP, for example. If it can be determined that the policy could not possibly be evaluated as a result of a request for one of the PEPs, then it can be ignored. For example if the policy contains two Subject attributes in conjunction, only one of which is trusted by the STSs used by the PEPs, then this policy can never be evaluated. Once the restricted applicable policy set is identified for each PEP, then the combined set of policies may be pushed to the PDPs 16a, 16b used by those PEPs, and stored in the respective policy stores 62a, 62b associated with those PDPs. Exemplary components used for the policy evaluation and dissemination process are shown in FIG. 6. An exemplary process which may be operated by the Policy Evaluation and Propagation Engine 60 shown in FIG. 6 is described below as "Process 3" and is illustrated in FIGS. 7a and 7b. FIG. 7a illustrates Process 3 when triggered by one or more new policies being created in the central repository 61, and FIG. 7b illustrates Process 3 when triggered by one or more new attributes being associated with a PEP.

Process 3 can be operated as follows:

1. If there are PEPs 14 that have not been evaluated, select the next PEP in the list and retrieve the list of relevant attributes.
2. For each policy in the central policy set that has not yet been evaluated for that PEP, determine the minimum set of attributes that are required to evaluate the policy. Some policies (for example with logical OR conditions) will result in multiple minimal attribute sets.
3. If at least one of the policy minimal sets is contained within the possible PEP attribute set, then associate the policy to the PEP.
4. Once all PEPs have been evaluated, for each PDP policy store 62, identify all PEPs 14 that use that PDP 16.
5. Push the policies associated with each identified PEP 14 to the PDP policy store 62.

It may be arranged that any new policy in the central repository 61 results in the process being re-run from Step 1 (noting that only the or each new policy generally needs to be evaluated against each PEP in Step 2b). This version is illustrated in FIG. 7a.

Alternatively, or preferably additionally, it may be arranged that any new addition to a PEP attribute list results in the process being re-run, with Steps 2 onwards only needing to be performed in respect of the or each PEP to which any new attributes are deemed to be of relevance, but in this instance, Steps 2b onwards would generally need to be performed in respect of each existing policy for a full update of the policy stores to be completed. This version is illustrated in FIG. 7b.

In relation to the above, various factors may determine whether a particular attribute should be deemed "relevant" to a PEP. These factors may depend on the type of attribute. As has been explained earlier, in known access control technologies, there are generally three categories of attributes. The first two sets are the actions/resources that are requested. Action/resource attributes may be somewhat interchangeable—for example a resource may be provided that only allows queries, and a separate resource that allows deletions, or a resource may be provided that allows both queries and deletions. In the above, these may be defined by the implementation of the PEP—i.e. what attributes it extracts from the access request. Also in the above, however, there is the Interceptor-managed cache of attributes that have been seen recently, which is a subset of this previous attribute set.

In addition to the above, resource attributes (only) may also be dynamic for resources that are information stores (e.g. databases). In relation to this, the PEP may be programmed to extract a general attribute, but this may be specialised by the request for information in the store. For example in a database of employees, the PEP may be implemented to extract the attribute 'employeeID', but the actual attribute/value requested may be 'employeeID=803249095'. It may be determined that the request for the attribute 'employeeID=803249095' is possible from the information in the data-store.

The other category is subject attributes. These may be defined by the policy of the STS that specifies which attributes it is willing to validate. Therefore the PEP subject attribute set may be defined by the policies of the STS(s) that it uses for subject attribute validation. Again there may be the subset of subject attributes seen by the Interceptor.

In view of the above, whether a particular attribute is be deemed "relevant" to a PEP or not may be determined in any of the following ways:

For 'action' attributes: from the particular PEP implementation, or from the Interceptor.

For 'resource' attributes: from PEP implementation, resource state, or the Interceptor For 'subject' attributes: from STS policies, or from the Interceptor.

It should be noted that the manner in which a particular attribute is be deemed "relevant" to a PEP need not affect the manner in which the policy dissemination in then performed, however. Policy dissemination in the manner set out in FIG. 7(b) may be triggered by any determination that a particular attribute has been deemed newly-relevant to a particular PEP, irrespective of the type of attribute, or the reason for the determination of relevance.

Reducing Policy Set Based on Data Held by Information Resource

In an alternative to the above, although a policy may be deemed relevant to a PEP, the distribution of that policy to the relevant PDP may be delayed. For example, although a policy may refer to data that can be stored within an information system (i.e. the resource attributes used by the PEP match the policy), no data matching the attributes may exist within the information system. This is particularly relevant for information systems such as the EPCIS (EPC Information Service) and the EPCDS (EPC Discovery Service) within the EPCglobal architecture. In this model a subset of the information contained within the EPCIS is published onto the EPCDS for the purposes of client discovering the existence of the EPCIS. Whereas the record within the EPCIS may contain great detail, the record of the Discovery Service may only contain the EPC, a timestamp, and a reference back to the EPCIS. In both systems the PEP may ask its chosen PDP for decisions about whether to allow a client application access to information about specific EPCs (Electronic Product Codes). If it is known that the systems do not currently hold data about some EPCs, then policies that allow access only to those EPCs do not need to be stored and evaluated. A possible effect of this approach is that clients who may otherwise have received a "No Records Found" notification may instead receive an "Access Denied" notification, which may be contrary to requirements in some contexts. For systems such as the EPCIS and EPCDS described above however, this is not necessarily a problem since individual access requests for data records can generally be grouped into a single response. A client should not necessarily be able to tell whether additional records exist but are denied to them, or whether those records have not been found, since this information in itself can be used to infer confidential business information (such as the organisation which has handled the product).

Although all policies may be copied to both the EPCIS and to the EPCDS, it is likely that only a subset of the data (restricted in both the attributes and the objects represented) will appear on the Discovery Service. Since this Discovery Service is generally expected to be operated by a third party, there is generally a desire not to publish unnecessary policies both for scalability and confidentiality reasons.

In this scenario, although it may be identified that a set of policies may be applicable to the Discovery Service (e.g. policies that specify EPCs), the transfer of such policies to the PDP of the Discovery Service can be delayed until the publication of the EPC data has taken place. Technically this can be achieved by using an event from the publisher application to the module responsible for disseminating the policies to the various PDPs.

Alternatively, for general information services, a trigger may be placed on the datastore to monitor changes to data records and to propagate current record attributes (such as table names and record attributes) into the PEP Attribute Store. This approach is shown in FIG. 9, and an appropriately extended PEP Attribute Store shown in FIG. 8.

The process may be a modification of Process 3 presented earlier. For example, Steps 1-3 may be executed, but the policy is not then pushed to the appropriate PDP policy stores. Instead, after Step 3 has been completed, the following "Process 4" may be performed:
1. For each PEP
2. For each policy currently associated with the PEP
3. Determine if policy can be used to release any data currently held by the information resource. If so, place the policy into a set of policies that are currently required by the PEP.
4. Once all PEPs have been evaluated, for each PDP policy store, identify all PEPs that use that PDP.
5. Push the policies currently required by each PEP to the PDP policy store.

Generally, whenever new data is added to the information resource, the following "Process 5" would then be operated:
1. For the PEP protecting the information resource
2. For each policy currently associated with the PEP
3. Determine if any policy applies to the newly inserted data. If so add it/them to the set of policies currently required by the PEP
4. Push the new additional policies to the PDP used by the PEP for the updated information resource.

Whenever data is removed from the information resource the following "Process 6" may be operated:
1. For the PEP protecting the information resource
2. For each policy in the currently required policy set
3. Determine if the policy is still required.
4. If the policy is no longer required by any PEP using the PDP, then remove the policy from the PDP store.

Reducing Policy Set Based on Caching of Recently Used Attributes

In another alternative to the above, the distribution of policies may also be delayed until client application requests are seen that relate to a policy. Although the PEP may be capable of asking for an access control decision using Subject attributes contained within a policy, it may be the case that no client application request will ever arrive that will require the evaluation of that policy. This can be handled by the Interceptor 40 previously described between the PEP 14 and the PDP 16. The Interceptor may maintain a cache of recently used Subject attributes. Whereas in the earlier-described version the intention is to identify any Subject attribute that may be used by a PEP, the intention in this version is to identify the set of Subject attributes that have recently been validated. When a Subject attribute is added to the currently-used attribute set, related policies may be loaded dynamically onto the PDP.

FIG. 10 shows an appropriately extended PEP Attribute Store including recently used recent Subject attributes 121, while FIG. 11 shows the operation of the PEP-PDP Interceptor 40 in caching the recently observed Subject attributes.

The following "Process 7" describes how this may be done:
1. PEP-PDP Interceptor 40 receives access decision request
2. Extract Subject attributes used within the request
3. Place attributes into the current cached Subject attributes list, or refresh the timestamp on attributes already in the cached list.

This process may be performed in parallel with the existing Process 1 or Process 2 previously described. During the policy evaluation described within Process 3, it may be arranged that only the cached Subject attributes are considered to be within the PEP policy set instead of all possible Subject attributes. Note that the collection of all possible Subject attributes may still be operated in parallel, allowing an easy switchover between a local policy set for only recently observed Subjects, and a wider policy set for all possible Subjects.

The invention claimed is:

1. A method of updating a policy store associated with a policy decision point of an access control system, the policy decision point being arranged to provide, in response to received decision requests, access control decisions in dependence on one or more policies stored in said policy store, each policy specifying a predetermined access control decision to be provided in response to a particular access request made in respect of a particular attribute or combination of attributes, the policy decision point being associated with at least one policy enforcement point arranged to implement access control in accordance with access control decisions provided by said policy decision point in response to decision requests submitted by said policy enforcement point, said policy enforcement point having associated therewith an attribute store providing data relating to attributes in respect of which access requests have previously been made via said policy enforcement point; the method comprising:
monitoring decision requests submitted by said policy enforcement point to said policy decision point;
identifying, from said monitoring and with reference to the attribute store associated with said policy enforcement point, decision requests using a computer processor, the decision requests being submitted by said policy enforcement point in respect of any attribute for which said attribute store provides no data; and
in the event that a decision request is identified in respect of an attribute for which said attribute store provides no data:
updating said attribute store with data relating to said attribute; and
updating the policy store associated with said policy decision point with one or more policies specifying predetermined access control decisions to be provided in response to access requests made in respect of said attribute.

2. A method according to claim 1 further comprising performing the steps of updating said attribute store and updating the policy store also in the event that a decision request is identified in respect of an attribute for which said attribute store provides insufficient data, or in respect of an attribute for which said attribute store provides an indication that updating of the attribute store or updating of the policy store is required.

3. A method according to claim 1, said method comprising intercepting requests submitted by said policy enforcement point to said policy decision point whereby to perform said monitoring.

4. A method according to claim 3 wherein decision requests identified in said identifying step are prevented from reaching the policy decision point until after the step of updating the policy store has been performed.

5. A method according to claim 3 wherein in the event of a decision request being identified in said identifying step, the policy decision point is delayed from making an access control decision in response to said decision request until after the step of updating the policy store has been performed.

6. A method according to claim 1, said method comprising performing said monitoring without requests submitted by said policy enforcement point to said policy decision point being held from reaching said policy decision point.

7. A method according to claim 1 wherein said monitoring step comprises subjecting said decision requests to deep packet inspection.

8. A method according to claim 1 wherein said monitoring step comprises sniffing said decision requests.

9. A method according to claim 1 wherein updating an attribute store further comprises identifying any attributes deemed unnecessary in said attribute store and removing them from said attribute store.

10. A method according to claim 9 wherein an attribute in an attribute store is deemed unnecessary in the event that a predetermined period of time has elapsed since a previous access request was made via said policy enforcement point in respect of said attribute.

11. A method according to claim 1 wherein updating a policy store further comprises identifying any policies deemed unnecessary in said policy store and removing them from said policy store.

12. A method according to claim 11 wherein a policy in a policy store is deemed unnecessary in the event that a predetermined period of time has elapsed since a previous access control decision was made in dependence on said policy.

13. A method according to claim 1 wherein updating of said policy store is performed in response to a determination that an attribute store associated with a policy enforcement point with which said policy decision point is associated has been updated.

14. A method according to claim 1 wherein updating of said policy store is performed in response to an indication of a new policy being available from a policy controller.

15. A method according to claim 1 wherein updating of said policy store is performed in response to an indication from a policy controller of an existing policy being withdrawn.

16. An apparatus comprising:
a computer processing system, comprising a computer processor, configured to:
update a policy store associated with a policy decision point of an access control system, the policy decision point being arranged to provide, in response to received decision requests, access control decisions in dependence on one or more policies stored in said policy store, each policy specifying a predetermined access control decision to be provided in response to a particular access request made in respect of a particular attribute or combination of attributes, the policy decision point being associated with at least one policy enforcement point arranged to implement access control in accordance with access control decisions provided by said policy decision point in response to decision requests submitted by said policy enforcement point, said policy enforcement point having associated therewith an attribute store providing data relating to attributes in respect of which access requests have previously been made via said policy enforcement point, the computer processing system being configured, in order to update the policy store, to at least:
monitor decision requests submitted by said policy enforcement point to said policy decision point;
identify, from said monitoring and with reference to the attribute store associated with said policy enforcement point, decision requests submitted by said policy enforcement point in respect of any attribute for which said attribute store provides no data; and
in the event that a decision request is identified in respect of an attribute for which said attribute store provides no data:
update said attribute store with data relating to said attribute; and
update the policy store associated with said policy decision point with one or more policies specifying predetermined access control decisions to be provided in response to access requests made in respect of said attribute.

* * * * *